US008358022B2

(12) United States Patent
Wilks

(10) Patent No.: US 8,358,022 B2

(45) Date of Patent: Jan. 22, 2013

(54) HYDROELECTRIC POWER GENERATOR

(76) Inventor: Paul L. Wilks, Chesapeake, OH (US)

( * ) Notice: Subject to any disclaimer, the term of this patent is extended or adjusted under 35 U.S.C. 154(b) by 776 days.

(21) Appl. No.: 12/560,155

(22) Filed: Sep. 15, 2009

(65) Prior Publication Data

US 2010/0066092 A1 Mar. 18, 2010

Related U.S. Application Data

(60) Provisional application No. 61/192,032, filed on Sep. 15, 2008.

(51) Int. Cl.
*F03B 13/00* (2006.01)
*H02P 9/04* (2006.01)

(52) U.S. Cl. .......................................................... 290/43

(58) Field of Classification Search .................... 290/43, 290/54; 60/398; 416/84; 415/210.1, 3.1
See application file for complete search history.

(56) References Cited

U.S. PATENT DOCUMENTS 328,418 A * 10/1885 Main ............................... 290/43
4,030,300 A * 6/1977 Thompson ...................... 60/639
4,345,160 A * 8/1982 Smith ............................. 290/52
4,467,218 A * 8/1984 Andruszkiw et al. ........... 290/54
5,644,170 A * 7/1997 Bynum et al. .................. 290/43
6,304,002 B1 * 10/2001 Dehlsen et al. ............... 290/1 C
6,861,766 B2 * 3/2005 Rembert ......................... 290/43
7,432,612 B2 10/2008 Lomerson et al.
7,462,949 B2 * 12/2008 Coman ........................... 290/54
7,464,546 B2 12/2008 Peacock
7,687,931 B2 * 3/2010 Gasendo ......................... 290/54
2008/0238104 A1 * 10/2008 Dale ............................... 290/54
2009/0015016 A1 1/2009 Steelberg et al.

* cited by examiner

*Primary Examiner* — Julio Gonzalez

(74) *Attorney, Agent, or Firm* — Frost Brown Todd LLC

(57) ABSTRACT

A hydroelectric power generator system having a plurality of water wheels affixed to a support structure in a stair step formation. At the top of the support structure is a upper water reservoir with a plurality of spouts each having a shut off valve. At the bottom of the support structure is a water basin. When the valves on the spouts are open, water is flowing downward on the water wheels, which causes the water wheels to rotate. The rotational energy from the water wheels are transferred to rotary shafts via a pulley system. The rotational energy from the rotary shafts are transferred to generators using a ring and pinion gear system. The generators convert the rotational energy into electrical energy that is stored.

11 Claims, 7 Drawing Sheets

HYDROELECTRIC POWER GENERATOR

PRIORITY CLAIM

This U.S. Nonprovisional patent application claims priority to U.S. Provisional Patent Application Ser. No. 61/192,032, filed Sep. 15, 2008, entitled "Green Water Machine," which is incorporated herein by reference.

BACKGROUND

A variety of systems for generating electricity have been made and used over the years in a variety of contexts. For instance, electrical power can be generated through combustion of fossil fuels, such as, natural gas, gasoline, and coal, but such fuel combustion can be accompanied by harmful emissions, e.g., nitrogen oxides, sulfurous acid, carbonaceous particulates, that may be both difficult and expensive to either contain, or remove, from the exhaust gasses. Further, the processing of these fuels sometimes requires the expenditure of additional energy, that can make the process inefficient, costly, and potentially hazardous, and further creates harmful emissions.

Nuclear power plants are another source for generating electrical power, and may be viewed as an alternative source to hydrocarbon fuels. Nuclear power plants may use the energy generated from a fission chain reaction of uranium fuel to heat up cooling water into steam at high temperature and high pressure, so as to push a steam turbine which drives a generator to produce power, thereby achieving an effect of generating the electricity. While nuclear power plants can generate a large amount of electricity, they can be very expensive to build and may pose security problems. Also, the disposal and storage of spent nuclear fuel can be an expensive and a highly contentious problem.

Wind driven generators use wind power to drive blades of a wind turbine. Sometimes the speed of the blade rotation is increased through a booster to aid the generator in producing electricity. However, the towers used to support wind turbines can be relatively complex and expensive. Also, wind power can be quite unstable when it is generated as the strength and direction of the wind can change frequently making it more difficult for energy to be accumulated. Wind power, while available, is also dependent on the weather and can be inefficient and relatively expensive.

Solar panels are another alternative to fossil fuels. Solar panels are comprised of several individual solar cells that collect solar radiation from the sun and actively convert that energy into usable electricity. Solar panels, however, can be quite costly, very low in efficiency and are unusable at night and on cloudy or stormy days. In addition, the amount of sunlight that arrives at the Earth's surface is not constant. It can depend on location, time of day, time of year, and weather conditions. Also, because the sun doesn't deliver much energy to any one place at any one time, a large surface area may be required to collect the energy at a useful rate.

While systems have been made and used that harness the energy incumbent in various sources, it is believed that no one prior to the inventor has made or used a system as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
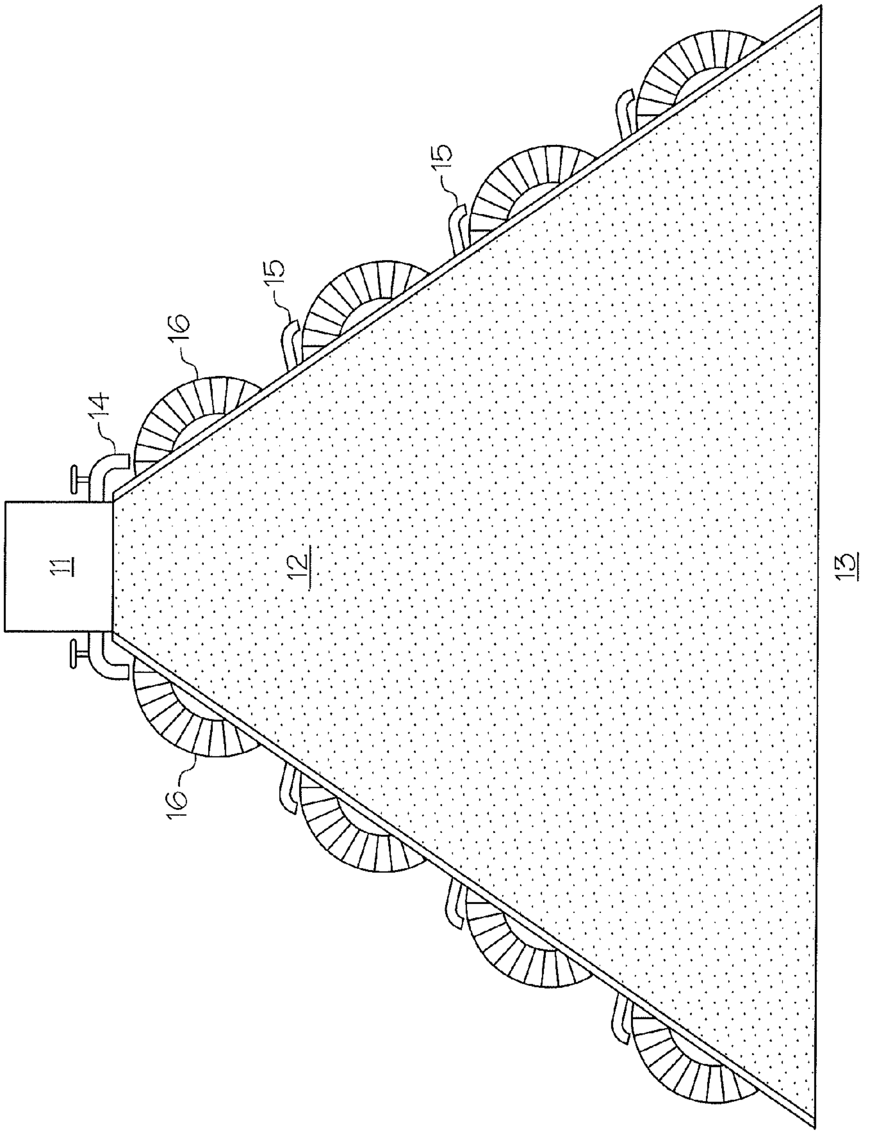
FIG. 1 depicts an end view of an exemplary hydroelectric power generator system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As shown in the FIG. 1, the exemplary hydroelectric power generator system has a plurality of water wheels (16) affixed to a support structure (12) in a stair step formation. In one example, the support structure could be a hill. In another example, the support structure could be a tower. In a further example, the support structure could be any structure having a solid foundation and is capable of supporting at least two water wheels. At the top of the support structure is a upper water reservoir (11) with a plurality of spouts (14) each having a shut off valve. At the bottom of the support structure is a water basin (13). In one example, the water basin could be a pond. In another example, the water basin could be any other water body reservoir that collects water. When the valves on the spouts (14) are open and water is flowing downward on the water wheels (16), each water wheel (16) has a water collection pan or housing, or other type of enclosing structure configured for catching the water discharged from the spout. The collection pan or other similar enclosing structure around the water wheel also has a spout (15) used to discharge water onto the next water wheel. The spouts (15) may or may not have a shut off valve.

Figure 2:
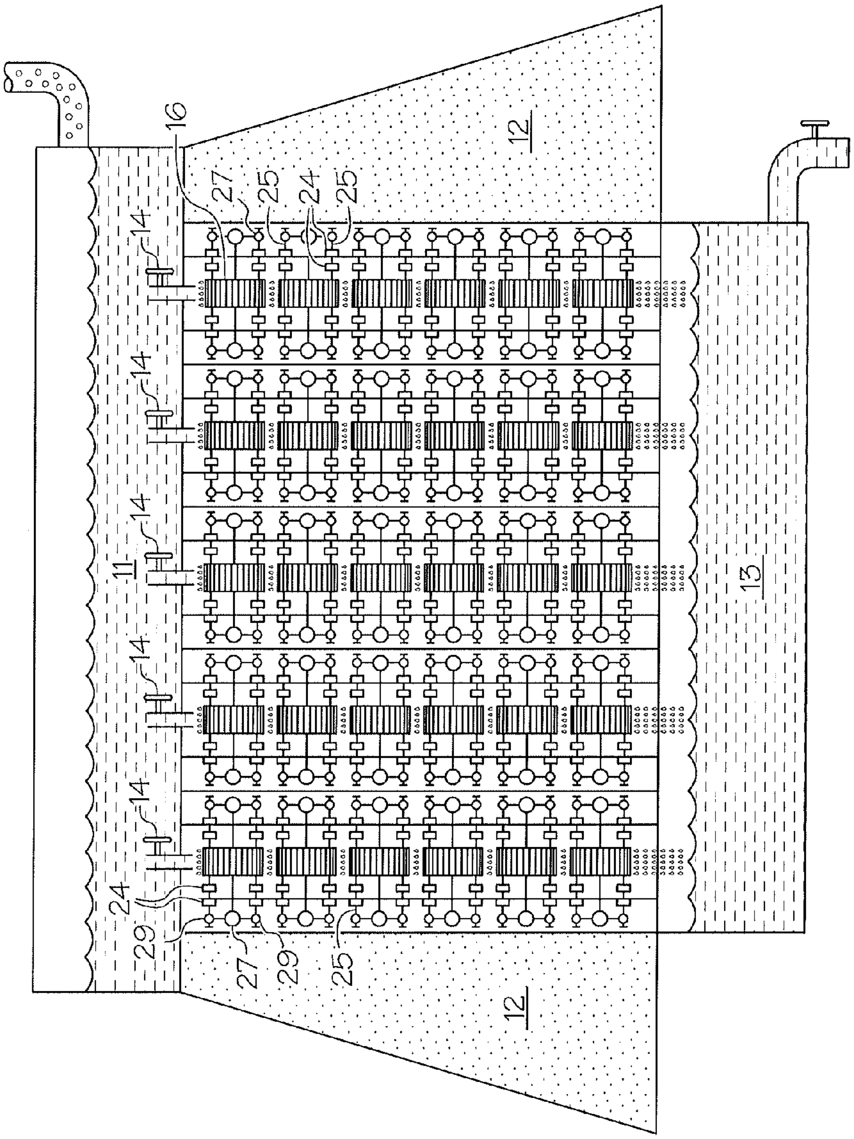
FIG. 2 depicts a side view of an exemplary hydroelectric power generator system.

In the exemplary hydroelectric power generator system of FIG. 2, an upper water reservoir (11) is shown located at the top of a support structure (12). At the bottom of the support structure is a water basin (13). A plurality of spouts (14) each having a shut off valve are shown. Each valve feeds water to a set of water wheels (16) having a stair step configuration. The set of water wheels are separated from adjacent sets of water wheels by a partition (22). Each water wheel (16) has its own shaft which is connected through a pulley system to four rotary shafts (axles) (25), two at each end of the water wheel shaft. The pulley system has two large water pulleys (27) on each end of the water wheel (16). Each large water pulley (27) is connected to two small water pulleys (29) using double belts. The small water pulleys (29) are connected to the rotary shafts (25) and turn the axles to generate electricity. Each rotary shaft has two generators (24) per axle. Each water wheel in the exemplary power generator system may have eight generators attached.

In one example, the generator can be a wind mill motor without blades. In another example, the generator can be any suitable generator for generating electrical energy. In a further example, the generator can be a low RPM generator. In one example, the RPM speed can range from about 100 RPM to about 600 RPM. In another example, the RPM speed can range from about 150 RPM to about 400 RPM. In a further example, the RPM speed can range from about 150 RPM to about 300 RPM. The generator output size and the number of generators may vary and depend on the desired power requirements. In one example, the generator output can range from 50 kW to 3 MegaWatts. In another example, the generator output can range from 50 kW to about 900 kW. In a further example, increasing the width of the water wheel can allow for the use of a larger output-sized generator. Different generators may be substituted or varied depending on their size and specifications needed to supply a certain power output.

By way of example only, the rotary shaft can be a automobile axle. In another example, the rotary shaft can be an automobile axle with a differential housing. In a further example, the rotary shaft can be a rear wheel drive automobile axle with positive traction.

Figure 3:
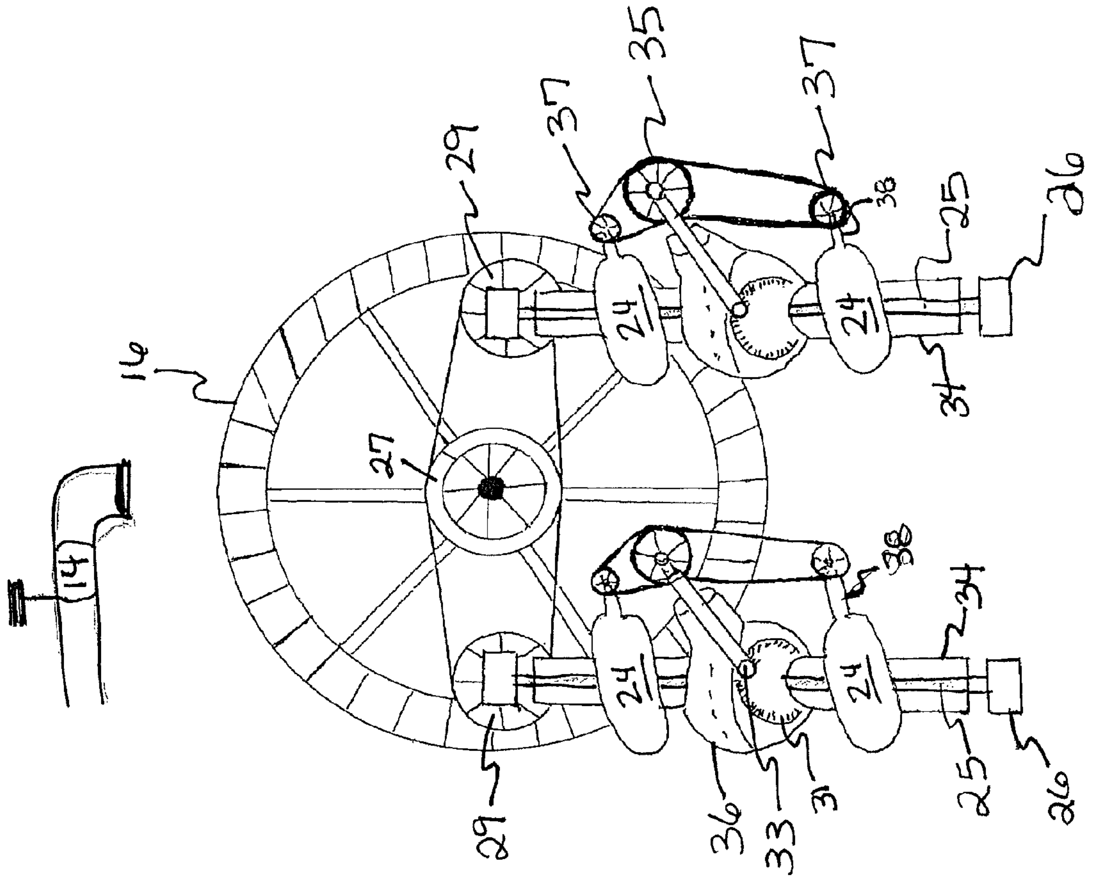
FIG. 3 depicts a perspective side view of an exemplary water wheel generator unit.

FIG. 3 shows a side perspective view of an exemplary water wheel generator unit. A water wheel (16) is provided having a spout (14) used as a passage for flowing water. The water wheel (16) is connected to a large water pulley (27) that is connected to two small water pulleys (29) using double (two) belts. The two small water pulleys (29) are each attached to a rotary shaft (25) having a differential device (36). Each rotary shaft (25) in the exemplary water wheel generator unit has two generators (24) attached to the rotary shaft housing (34). Each generator (24) has a small generator pulley (37) mounted to it. In this example, the differential device (36) of the rotary shaft (25) comprises a ring gear (31) and pinion gear (33). The ring gear (31) is affixed to the rotary shaft (25) so that it spins as the axle spins. The pinion (33), comprising a head portion and a body shaft, has the head portion engaged with the ring gear (31) so that it spins as the ring gear (31) spins. The pinion gear (33) has a large pinion pulley (35) attached to its end. Belts from the two small generator pulleys (37) connect to the large pinion pulley (35) attached to pinion gear (33). Optionally, a fan (26) may be attached to the end of rotary shaft (25) to cool the generators (24) attached to the rotary shaft housing (34).

In one example, the diameter of the small generator pulley (37) can range from about 1" to about 4". In another example, the diameter of the small generator pulley (37) can also range from about 2" to about 4". In one example, the diameter of the large pinion pulley (35) can range from about 8" to about 24". In another example, the diameter of the large pinion pulley (35) can also range from about 10" to about 16".

As the flowing water impacts water wheel (16) and causes water wheel (16) to rotate, the rotational energy from the water wheel is transferred to the large water pulley (27). The rotational energy from the large water pulley (27) is transferred to two small water pulleys (29) that are connected to the large water pulley (27) using double belts. The two small water pulleys (29) are also connected to the rotary shaft (25) and turn the rotary shaft (25). As the rotary shaft (25) turns, it turns the ring (31) and pinion gear (33) and the fan (26) that is attached to the rotary shaft (25). The large pinion pulley (35) connected to the pinion gear (33) spins based on the movement of the pinion gear (33). The two small generator pulleys (37) connected to the large pinion pulley (35) of the pinion gear (33) using double belts spin to create the rotational energy for each generator (24). The generators (24) convert the rotational energy into electrical energy that is stored.

In one example, the diameter of the large water pulley (27) can range from about 12" to about 36". In another example, the diameter of the large water pulley (27) can also range from about 16" to about 32". In a further example, the diameter of the large water pulley (27) can range from about 22" to about 26". In one example, the diameter of the small water pulleys (29) can range from about 2" to about 10". In another example, the diameter of the small water pulleys (29) can also range from about 3" to about 7". In a further example, the diameter of the small water pulleys (29) can further range from about 4" to about 6".

The pulley system of FIG. 3 is just one illustrative example for transferring the drive produced by the rotary shaft (25) to rotate the shaft (38) attached to the generator (24). Other means may encompass a range of gears, sprockets and chain systems, or any other system apparent to those of ordinary skill in the art. In one example, the large (27) and small (29) water pulleys, large pinion pulley (35) or the small generator pulleys (37) can be v-belt pulleys. In another example, the large (27) and small (29) water pulleys, large pinion pulley (35) or the small generator pulleys (37) can be any suitable pulley for transferring the rotational energy from the water wheel shaft to the rotary shaft. The belts can be v-belts or any other suitable belt for turning pulleys. In a further example, a chain and sprocket set is used instead of pulleys and belts. Differing numbers of pulleys and gears may be used to transfer the force produced by the pinion gear (33) to the shaft (38) of the generator (24). The pulley system may serve as a ratio reducer or multiplier to maintain the shaft (38) to the generator (24) within an optimal rotation range.

Figure 4:
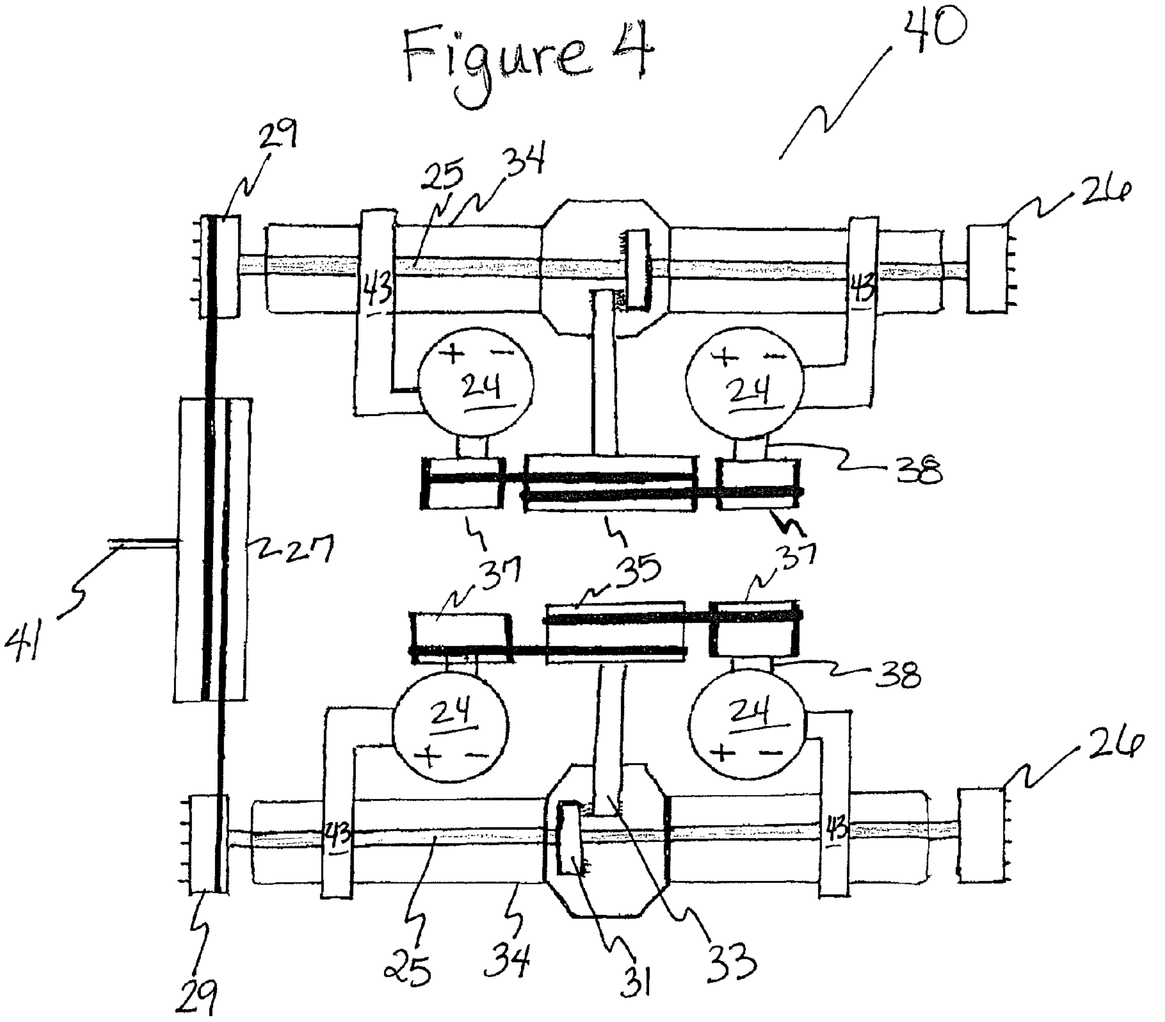
FIG. 4 depicts a top view of an exemplary water wheel generator unit.

FIG. 4 is a top view of an exemplary water wheel generator unit. The unit (40) includes a long shaft (41) that connects the water wheel (16) to the large water pulleys (27). The large water pulley (27) is connected to two small water pulleys (29) with belts. The two small water pulleys (29) are each attached to a rotary shaft (25) having a housing (34). The generators (24) are mounted (43) to the housing (34) and each generator (24) has a small generator pulley (37) attached. A ring gear (31) is shown attached to the rotary shaft (25), and is connected to a pinion gear (33). The pinion gear (33) has a large pinion pulley (35) attached to it so as the pinion gear (33) turns, it spins the large pinion pulley (35), which in turn spins the small generator pulleys (37). The rotation of the small generator pulleys (37) rotates the shaft (38) so that the generator (24) can produce electric power. The electric power produced by the generator (24) may then be sent to one or more batteries and ultimately converted by an inverter from direct current ("DC") to alternating current ("AC"). Optionally, a fan (26) may be attached to the end of rotary shaft (25) to cool the generators (24) attached to the rotary shaft housing (34).

Figure 5:
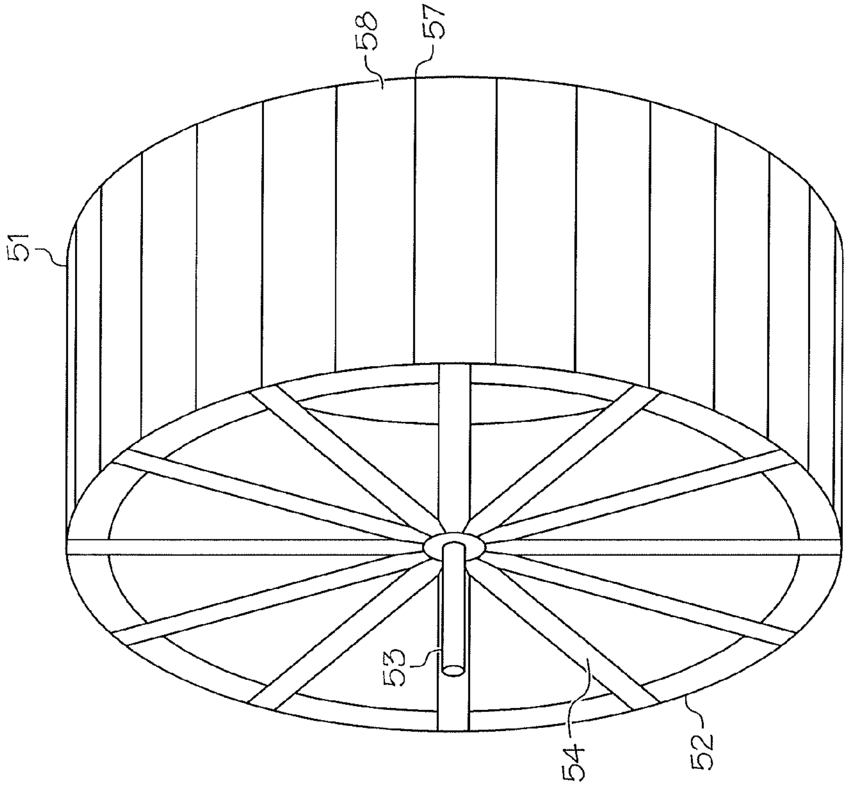
FIG. 5 depicts a perspective view of an exemplary water wheel.

FIG. 5 shows an exemplary view of a water wheel (51) that may be used in any of the power generator systems described above. The wheel-like member has a central circular body member (52) having a plurality of spokes (54) radiating from the water wheel axle (53) to its outside perimeter. On the outside perimeter of the central circular body member (52), a plurality of hinges (57) with paddles (58) are attached thereto. The paddles (58) ensure the water current is caught by the paddles and causes the wheel (51) to rotate. The kinetic energy stored in the wheel (51) while rotating is harnessed through a long shaft (water wheel axle) (53) connected to the central circular body member (52) that connects to a generator through a pulley system and a plurality of support members. In one example, the diameter of the water wheel can range from about 4 feet to about 12 feet. In one example, the width of the water wheel can also range from about 4 feet to about 12 feet. In another example, the width can also range from about 7 feet to about 12 feet. In a further example, the width can also be from about 10 feet to about 12 feet. Increasing the width of the water wheel may provide improved performance. The water wheel can be made from iron, steel or other suitable material.

Figure 6:
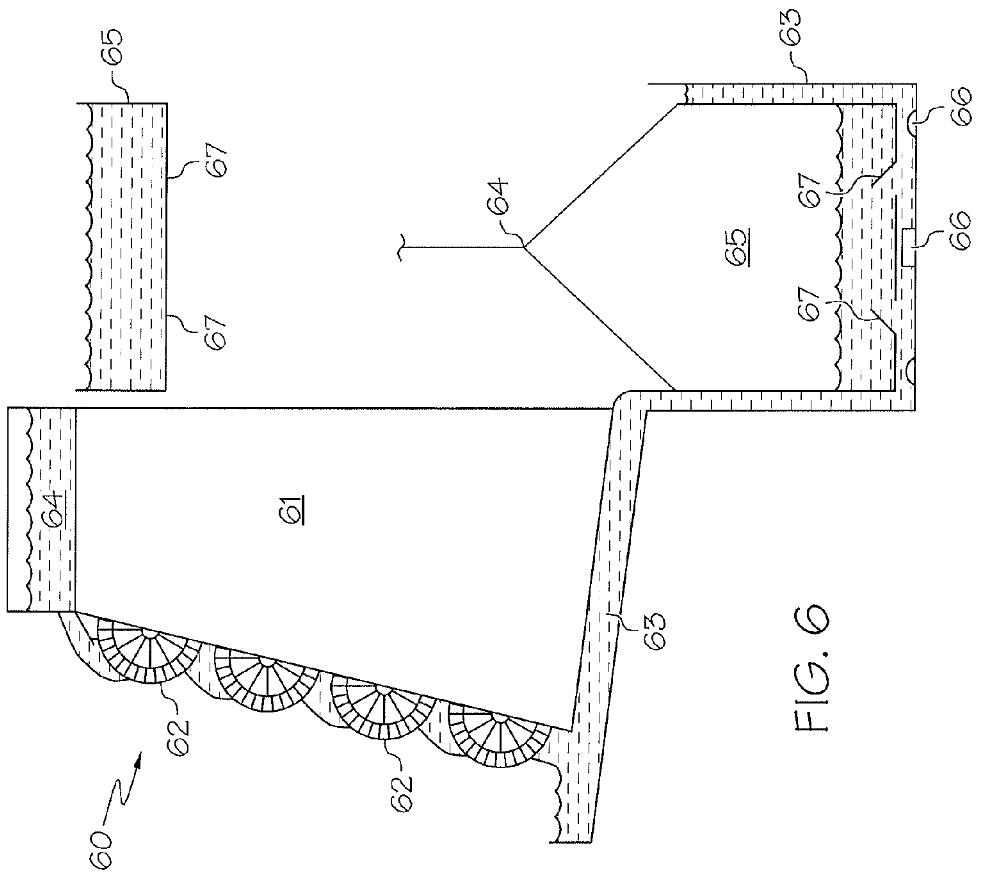
FIG. 6 depicts a side view of an exemplary hydroelectric power generator system.
Figure 7:
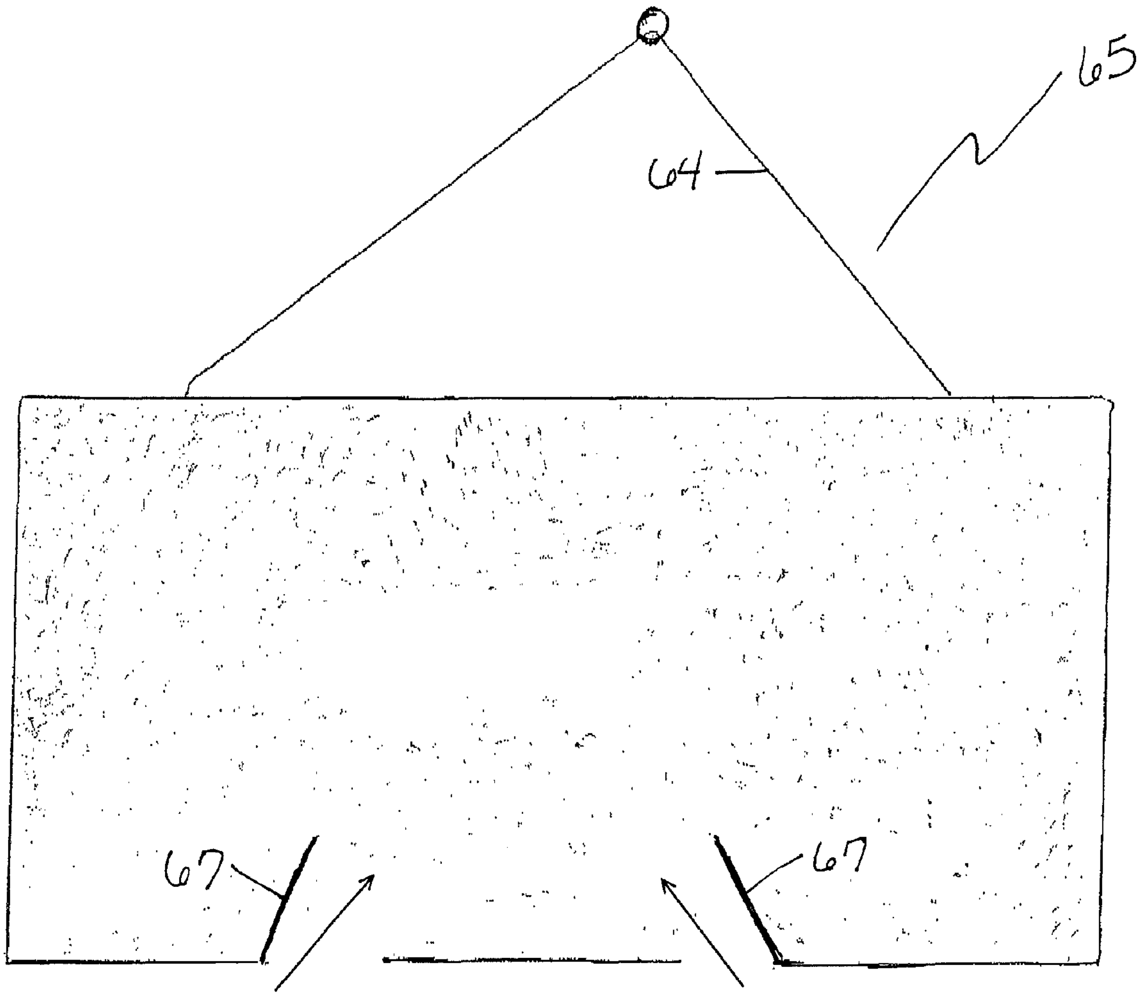
FIG. 7 depicts a front view of an exemplary water box.

In FIG. 6, the exemplary hydroelectric power generator system (60) includes a support structure (61) with a plurality of water wheels (62) attached to the support structure (61). At the top of support structure (61) is a upper water reservoir (64) which releases water onto a plurality of water wheels (62). At the bottom of the support structure, the water collects and flows to a water basin (63), which could also be a pond or other water body reservoir. Also shown is a water box (65) having at least one flap (67) that allows water to flow into the bottom of the water box (65) when placed in a water basin (63). Blocks (66) are located on the floor of the water basin (63) so that the water box (65) can rest on the blocks not touching the floor, and allow water to flow into it. The water box (65) also has a chain (64) or cable to lift the water box out of the water basin (63). When the water box (65) is lifted out, the pressure of the water will allow the flaps (67) to close and contain the water in the water box (65). The water box (65) is then lifted by a truck dossier or other suitable means to the top of the support structure (61) and the water from the water box (65) is loaded into upper water reservoir (64). A closer view of the water box (65) is shown in FIG. 7. Other means may be used to transfer water from the water basin (63) to the upper water reservoir (64). In one example, the water may be pumped from the water basin (63) to the upper water reservoir (64). In another example, the water may be pumped from the water basin (63) to the upper water reservoir (64) by harnessing some of the energy produced by the generator for the water pump.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A hydroelectric power generator system comprising:

a support structure having a top and a base;

at least one water wheel;

a water basin located at said base of said support structure;

an upper water reservoir located at said top of said support structure and disposed above said at least one water wheel;

at least one rotary shaft, wherein said at least one rotary shaft is in mechanical communication with said at least one water wheel;

a ring and pinion gear attached to said at least one rotary shaft;

at least two generator shafts, wherein said at least two generator shafts are in mechanical communication with said ring and pinion gear such that said ring and pinion gear causes said at least two generator shafts to turn;

at least two generators, wherein each one of said at least two generators is coupled to one of said at least two generator shafts;

means for transporting water from said water basin to said upper water reservoir; and a first pulley system, wherein said first pulley system mechanically connects said pinion gear to said at least two generator shafts, wherein said first pulley system comprises:

a pinion pulley in mechanical communication with said pinion gear, and at least two generator pulleys, wherein each of said two generator pulleys are in mechanical communication with a respective one of said at least two generator shafts, wherein said pinion pulley is connected to said two generator pulleys using a double belt.

2. The hydroelectric power generator system of claim 1 further comprising a fan attached to an end of said at least one rotary shaft.

3. The hydroelectric power generator system of claim 1, wherein said means for transporting water comprises the use of a water box.

4. The hydroelectric power generator system of claim 1, wherein said means for transporting water comprises pumping means.

5. The hydroelectric power generator system of claim 1 further comprising a second pulley system, wherein said second pulley system mechanically connects said at least one water wheel to said at least one rotary shaft, wherein said second pulley system comprises: at least one large pulley connected to said at least one water wheel; and a small pulley connected to said at least one rotary shaft, wherein said at least one large pulley is connected to said small pulley using a belt.

6. The hydroelectric power generator system of claim 5, wherein said second pulley system comprises a v-belt pulley system.

7. The hydroelectric power generator system of claim 1, wherein said first pulley system comprises a v-belt pulley system.

8. A water wheel power generator unit comprising;

a water wheel;

a water wheel axle that rotates in relation to said water wheel;

at least one rotary shaft comprising a differential housing, wherein said at least one rotary shaft is coupled to said water wheel axle through a water wheel pulley system;

a ring and pinion gear attached to said at least one rotary shaft within said differential housing;

a generator pulley system, wherein said generator pulley system mechanically connects said pinion gear to at least two generator shafts, wherein said generator pulley system comprises:

a pinion pulley, wherein said pinion pulley is in mechanical communication with said pinion gear, and two generator pulleys, wherein each of said two generator pulleys are in mechanical communication with a respective one of said at least two generator shafts, wherein said pinion pulley is connected to said two generator pulleys using a double belt; and at least two generators, wherein each of said at least two generators is coupled to one of said at least two generator shafts.

9. The water wheel power generator unit of claim 8, wherein said water wheel pulley system comprises: a large pulley, wherein said large pulley is in mechanical communication with said water wheel; and a small pulley, wherein said small pulley is in mechanical communication with said at least one rotary shaft, wherein said large pulley is connected to said small pulley using a belt.

10. The water wheel power generator unit of claim 8 further comprising a fan attached to said at least one rotary shaft.

11. A hydroelectric power generator system comprising:

a support structure having a top and a base;

a water basin located at said base of said support structure;

an upper water reservoir located at said top of said support structure, wherein said upper water reservoir comprises a plurality of water spouts;

a plurality of water wheel power generator units disposed below said plurality of water spouts, wherein said plurality of water wheel power generator units have a stair step configuration, and wherein said plurality of water wheel generator units comprise:

a water wheel;

a water wheel axle that rotates in relation to said water wheel;

at least one rotary shaft comprising a differential housing, wherein said at least one rotary shaft is coupled to said water wheel axle through a water wheel pulley system;

a ring and pinion gear attached to said at least one rotary shaft within said differential housing;

a generator pulley system, wherein said generator pulley system mechanically connects said pinion gear to at least two generator shafts;

and at least two generators, wherein each of said at least two generators is coupled to one of said at least two generator shafts; and means for transporting water from said water basin to said upper water reservoir.

* * * * *